(12) United States Patent
Hamada

(10) Patent No.: US 8,295,534 B2
(45) Date of Patent: Oct. 23, 2012

(54) FLAT PANEL DISPLAY DEVICE

(75) Inventor: Shingo Hamada, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 364 days.

(21) Appl. No.: 12/782,357

(22) Filed: May 18, 2010

(65) Prior Publication Data

US 2010/0310104 A1 Dec. 9, 2010

(30) Foreign Application Priority Data

Jun. 5, 2009 (JP) ................................. 2009-135748

(51) Int. Cl.
*H04R 1/02* (2006.01)
(52) U.S. Cl. .......... 381/386; 381/395; 381/333; 381/87; 381/388; 171/171; 171/179
(58) Field of Classification Search .................. 381/395, 381/333, 334, 87, 388, 386; 181/171, 179
See application file for complete search history.

(56) References Cited

U.S. PATENT DOCUMENTS

| 6,925,188 | B1 * | 8/2005 | Markow et al. | ............... 381/306 |
| 7,221,772 | B2 * | 5/2007 | Evenisse et al. | ............. 381/386 |
| 8,126,186 | B2 * | 2/2012 | Kameoka | ...................... 381/388 |
| 2006/0187364 | A1 * | 8/2006 | Fukano | ......................... 348/836 |
| 2006/0280328 | A1 * | 12/2006 | Nakagawa | .................... 381/388 |
| 2010/0246873 | A1 * | 9/2010 | Chen | ............................ 381/333 |

FOREIGN PATENT DOCUMENTS

| EP | 1 473 963 A1 | 11/2004 |
| EP | 1 942 669 A1 | 7/2008 |
| EP | 2 059 035 A2 | 10/2008 |
| GB | 2 349 037 A | 10/2000 |
| JP | 2001-309277 A | 11/2001 |
| JP | 2004-48294 A | 2/2004 |

OTHER PUBLICATIONS

Extended European Search Report of corresponding EP Application No. 10 16 3862.5 dated Oct. 13, 2010.

* cited by examiner

*Primary Examiner* — Disler Paul
(74) *Attorney, Agent, or Firm* — Global IP Counselors

(57) ABSTRACT

A flat panel display device includes a cabinet with front and rear cabinet parts, a flat panel display component, a holder, a speaker, and a pair of retaining members. The front cabinet part includes a speaker mount and a pair of support tubes. The holder includes an annular main body, a pair of arm, and a pair of engagement portions. The annular main body is disposed on the speaker mount. The engagement portions are disposed at distal end portions of the arms, respectively. The engagement portions engage with lower faces of the support tubes, respectively. The speaker is disposed on the annular main body of the holder. The retaining members are disposed at distal end portions of the support tubes, respectively. The retaining members have a diameter that is larger than that of support tubes.

10 Claims, 5 Drawing Sheets

FLAT PANEL DISPLAY DEVICE

CROSS-REFERENCE TO RELATED APPLICATIONS

This application claims priority to Japanese Patent Application No. 2009-135748 filed on Jun. 5, 2009. The entire disclosure of Japanese Patent Application No. 2009-135748 is hereby incorporated herein by reference.

BACKGROUND

1. Field of the Invention

The present invention generally relates to a flat panel display device. More specifically, the present invention relates to a flat panel display device having a speaker.

2. Background Information

A conventional flat panel display device includes a liquid crystal television set. The flat panel display device has a liquid crystal module, a stand, a cabinet, and a pair of speakers. The liquid crystal module is fixed on the stand. The liquid crystal module is covered by the cabinet. The cabinet includes a front cabinet and a rear cabinet. The speakers are attached to the front cabinet at the lower part inside the cabinet.

With the conventional flat panel display device, vibrations are transmitted from the speakers to the front cabinet. Thus, buzzing is generated from the front cabinet, which is unpleasant to the ears of the user.

Another conventional television device includes a speaker, a cylindrical component, upper and lower bosses, and a rod-shaped support (see Japanese Laid-Open Patent Application No. 2004-48294, for example). The cylindrical component sends sounds forward from the speaker. The upper and lower bosses are provided on either side of the cylindrical component. The rod-shaped support is disposed between the upper boss and the cylindrical component. The speaker contacts with the rod-shaped support. The ends of the speaker are fastened by screws to the upper and lover bosses. As a result, the speaker is attached at an angle, which reduces the contact surface area between the speaker and the front cabinet, and reduces the vibration that is transmitted from the speaker to the front cabinet.

However, with the conventional television device, the vibration of the speaker is transmitted from the lower end edge of the speaker directly to the front cabinet. Furthermore, this vibration is transmitted to the front cabinet via the screws. Thus, the reduction provided by angling the speaker is relatively small. Therefore, this does not sufficiently prevent buzzing from the front cabinet.

It is possible to deal with this by attaching a nonwoven cloth or other such vibration deadening material to the rear face of the front cabinet. However, this entails more parts and drives up the cost.

Also, since there is a gap between the speaker and the cylindrical component, sound can leak to the side from this gap and be trapped inside the cabinet, which lowers the acoustic quality.

Furthermore, attaching the speaker in an angled state to the front cabinet and fixing it with the screws entails more work, so the assembly efficiency is low.

SUMMARY

The present invention was conceived in light of the above-mentioned problems. One object of the present invention is to provide a flat panel display device with a speaker that is easy to attach and produces less buzzing.

In accordance with one aspect of the present invention, a flat panel display device includes a cabinet with front and rear cabinet parts, a flat panel display component, a holder, a speaker, and a pair of retaining members. The front cabinet part includes a speaker mount and a pair of support tubes. The speaker mount is disposed at a lower portion of the front cabinet part. The support tubes extend rearward relative to a rear face of the front cabinet part from the rear face of the front cabinet part above the speaker mount. The flat panel display component is disposed within the cabinet. The holder is made of an elastic material. The holder includes an annular main body, a pair of arm, and a pair of engagement portions. The annular main body is disposed on the speaker mount of the cabinet. The arms extend upward relative to the annular main body from both short side portions of the annular main body, respectively. The engagement portions are disposed at distal end portions of the arms, respectively. The engagement portions engage with lower faces of the support tubes, respectively. The speaker is disposed on the annular main body of the holder within the cabinet. The retaining members are disposed at distal end portions of the support tubes, respectively. The retaining members have a diameter that is larger than that of support tubes such that the retaining members prevent the engagement portions of the holder from sliding along the support tubes, respectively.

With this flat panel display device, it is possible to provide a flat panel display device with a speaker that is easy to attach and produces less buzzing.

BRIEF DESCRIPTION OF THE DRAWINGS

Referring now to the attached drawings which form a part of this original disclosure.

DETAILED DESCRIPTION OF EMBODIMENTS

A preferred embodiment will now be explained with reference to the drawings. It will be apparent to those skilled in the art from this disclosure that the following descriptions of the preferred embodiment are provided for illustration only and not for the purpose of limiting the invention as defined by the appended claims and their equivalents.

Figure 1:
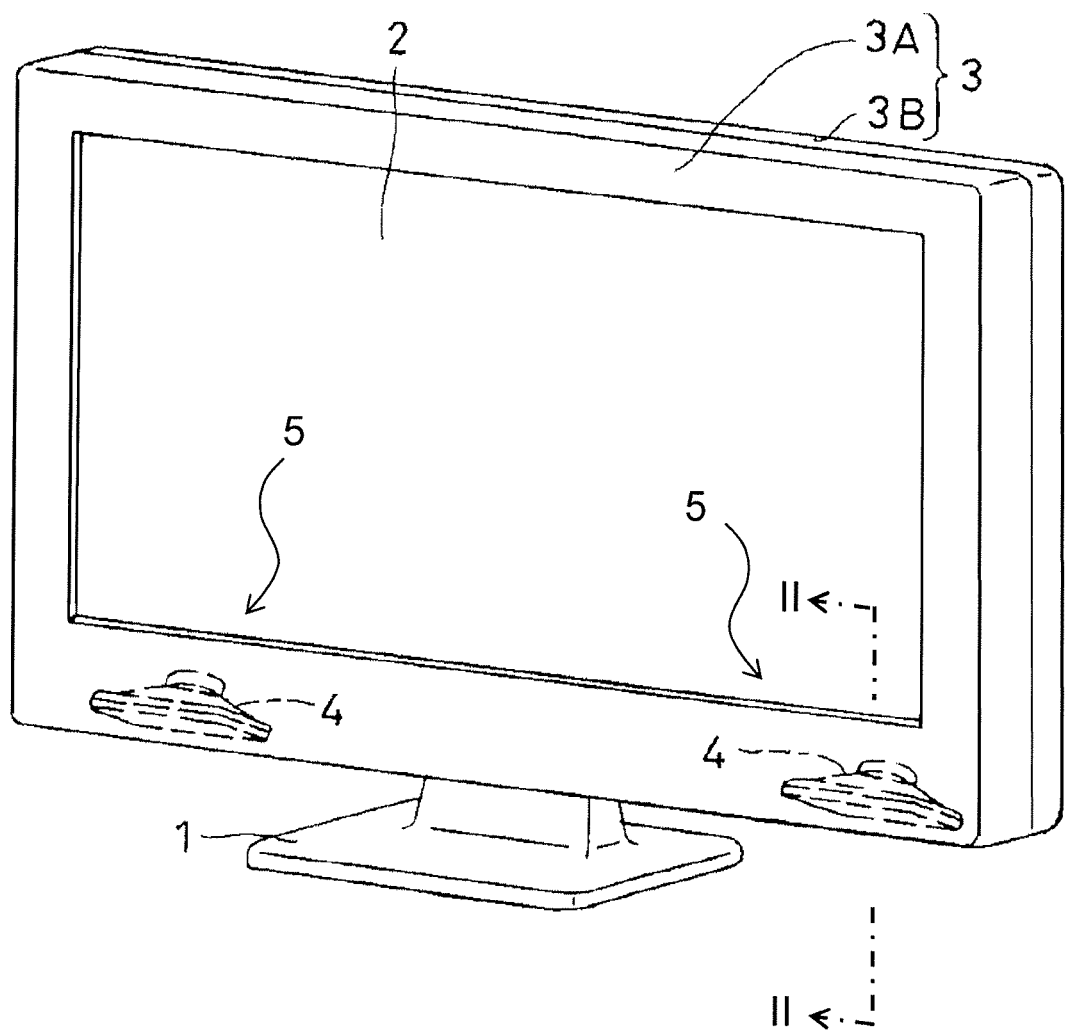
FIG. 1 is a perspective view of a flat panel display device in accordance with one embodiment.

As shown in FIG. 1, a flat panel display device includes a liquid crystal television set. Specifically, the flat panel display device includes a stand 1, a liquid crystal module (e.g., flat panel display component) 2, a cabinet 3, a pair of speaker 4, and a pair of speaker attachment structures 5. The liquid crystal module 2 is fixed on the stand 1. The liquid crystal module 2 is disposed within the cabinet 3, and is covered by the cabinet 3. The liquid crystal module 2 mainly includes a liquid crystal panel (e.g., liquid crystal cell) to display image. Furthermore, the liquid crystal module 2 further includes a frame, a light reflecting sheet, a light source, an optical sheet, and a bezel. The cabinet 3 includes a front cabinet (e.g., front cabinet part) 3A and a rear cabinet (e.g., rear cabinet part) 3B. The front cabinet 3A is integrally formed as a one-piece, unitary member, and is made of a synthetic resin. The rear cabinet 3B is integrally formed as a one-piece, unitary member, and is made of a synthetic resin. The speakers 4 are attached to the front cabinet 3A at a lower part inside the cabinet 3 with the speaker attachment structures 5, respectively.

As shown in FIGS. 2 to 5, each of the speaker attachment structures 5 of the flat panel display device includes a speaker mount 10, left and right support tubes 11, a pair of retaining members 12, a holder 13, and a pair of stoppers 24. The speaker mount 10 is integrally formed on a bottom plate 3a of the front cabinet 3A at a lower portion of the front cabinet 3A. The support tubes 11 are located above both lateral end portions of the speaker mount 10. The support tubes 11 are provided integrally protruding from a rear face 3b of the front cabinet 3A. The retaining members 12 are provided at distal end portions of the support tubes 11, respectively. The holder 13 is removably attached around an outer peripheral edge (e.g., outer peripheral portion) 4a of the speaker 4.

Figure 2:
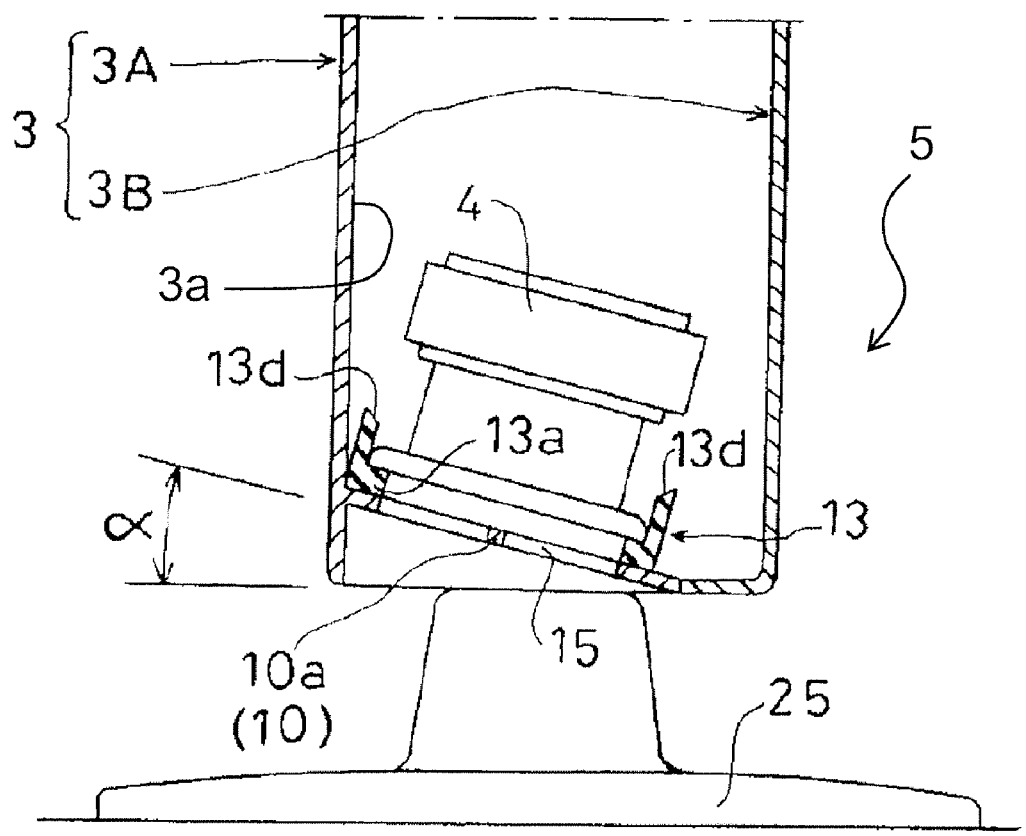
FIG. 2 is a partial cross sectional view of the flat panel display device taken along the II-II line in FIG. 1.
Figure 3:
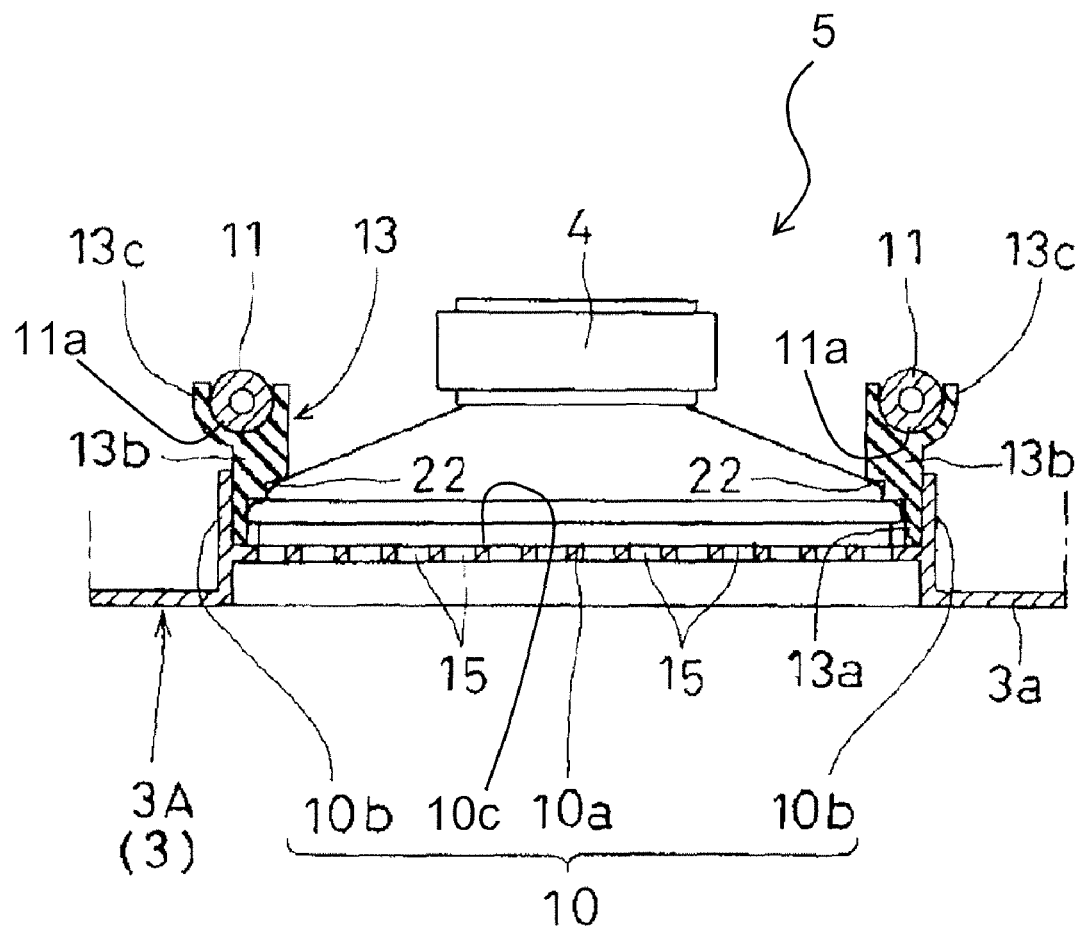
FIG. 3 is a partial cross sectional view of the flat panel display device taken along the line in FIG. 4.
Figure 5:
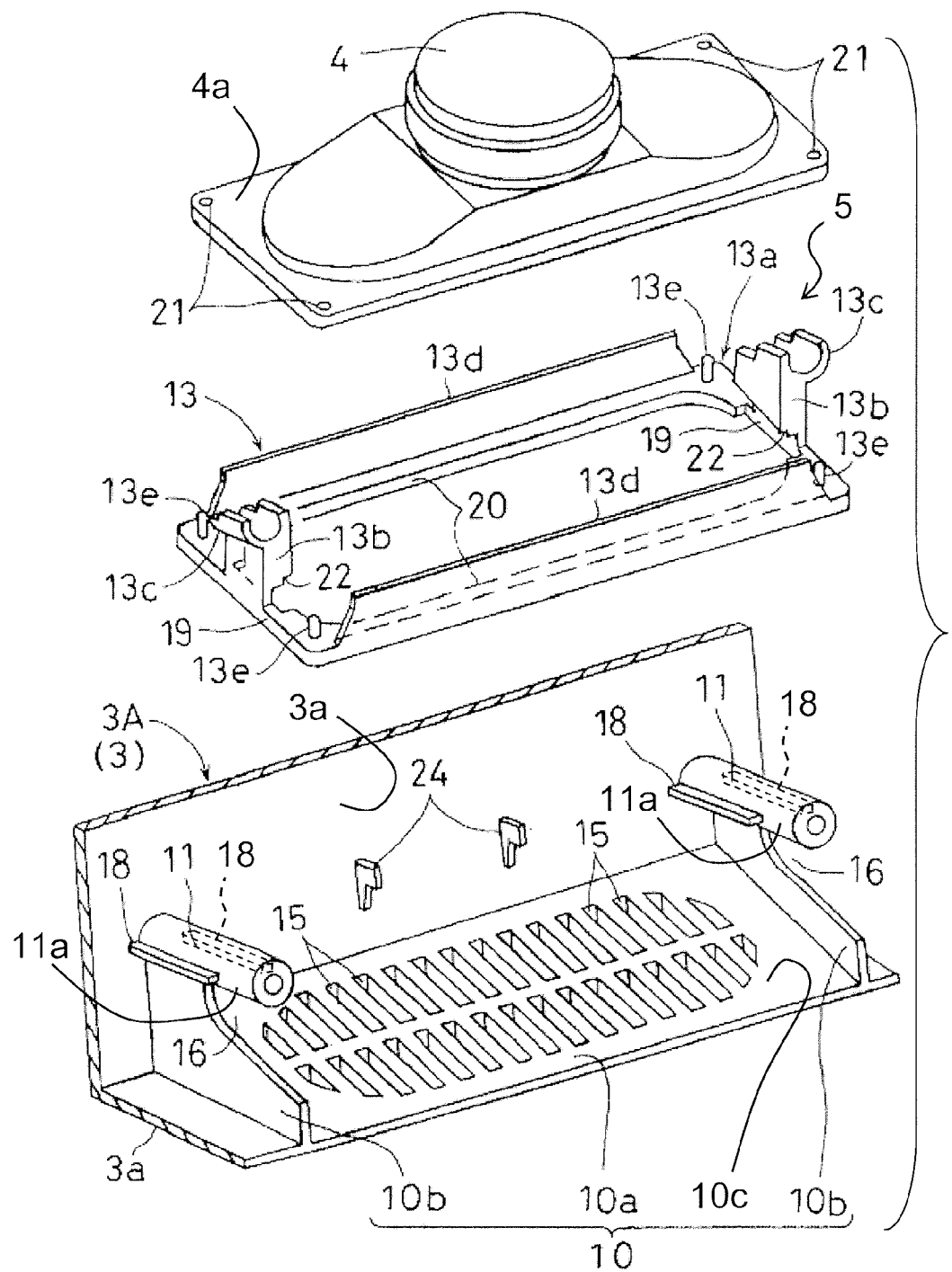
FIG. 5 is an exploded perspective view of the speaker attachment structure illustrated in FIG. 4.

The speaker mount 10 has a bottom plate 10a, and left and right side plates 10b. The bottom plate 10a is formed integrally with the bottom plate 3a. As shown in FIG. 2, the bottom plate 10a is angled upward at a specific inclination angle α (such as 10°) relative to the bottom plate 3a (e.g., a horizontal line) as approaching forward relative to a rear edge portion of the bottom plate 10a. In other words, an upper face 10c of the bottom plate 3a slants downward relative to the rear face 3b of the front cabinet 3A as approaching rearward relative to the rear face 3b of the front cabinet 3A. A plurality of ventilation holes 15 is formed in the bottom plate 10a such that sound from the speaker 4 can be outputted through the ventilation holes 15. The side plates 10b are provided rising up from both lateral end portions of the bottom plate 10a. As shown in FIG. 5, upper end front parts of the side plates 10b are formed integrally with front portions of lower faces 11a of the support tubes 11, respectively. Gaps are formed between upper end rear parts of the side plates 10b and rear portions of the lower faces 11a of the support tubes 11, respectively.

The holder 13 is made of an elastic material capable of elastic displacement, such as a soft rubber. The holder 13 is integrally formed as a one-piece, unitary member. The holder 13 has an annular main body 13a, left and right arms 13b, a pair of engagement clips 13c, a pair of slender edge plates 13d, and a plurality (four) of positioning protrusions 13e. The annular main body 13a is formed in the shape of an oblong ring. The annular main body 13a contacts with the oblong outer peripheral edge 4a of the speaker 4. The speaker 4 is disposed on the annular main body 13a. The annular main body 13a is removably attached around the outer peripheral edge 4a of the speaker 4. The annular main body 13a is disposed on the upper face 10c of the bottom plate 10a. The arms 13b are provided integrally protruding upward from slender longitudinal trusses (e.g., short side portions) 19 of the annular main body 13a, respectively. The trusses 19 form parts of short sides of the annular main body 13a, respectively. The engagement clips (e.g., engagement portions) 13c are provided integrally protruding from upper end portions (e.g., distal end portions) of the arms 13b, respectively. A lateral cross sectional shape of the engagement clips 13c as viewed from an axial direction of the support tubes 11 is substantially U-shape. The engagement clips 13c engage with the lower faces 11a of the support tubes 11, respectively. The slender edge plates 13d contacts with the outer peripheral edge 4a of the speaker 4. The slender edge plates 13d are provided integrally protruding from cross beams (e.g., long side portions) 20 of the annular main body 13a and along substantially the entire length of the cross beams 20 in a lengthwise direction of the annular main body 13a. The cross beams 20 form parts of long sides of the annular main body 13a, respectively. The edge plates 13d extend in the lengthwise direction of the annular main body 13a between arms 13b. When the outer peripheral edge 4a of the speaker 4 contacts with the annular main body 13a, the edge plates 13d also contacts with the outer peripheral edge 4a of the speaker 4. The positioning protrusions 13e are provided integrally protruding from four corners (e.g., corner portions) of the annular main body 13a. The positioning protrusions 13e are fitted into positioning holes 21 formed at four corners of a flange of the speakers 4, respectively. The arms 13b have concave steps (e.g., latching portions) 22 at inside faces of the arms 13b, respectively. The concave steps 22 engage with the outer peripheral edge 4a of the speaker 4 in a direction perpendicular to the upper face 10c of the speaker mount 10.

The retaining members 12 include rings that are larger in diameter than the outside diameter of the support tubes 11, respectively. The retaining members 12 are fastened by screws 17 to the distal end portions of the support tubes 11. The retaining members 12 prevent the engagement clips 13c from sliding along the lower faces 11a of the support tubes 11. A pair of positioning ribs (e.g., engagement ribs) 18 is provided to left and right front parts (e.g., front portions) of the outer peripheral face of each of the support tubes 11, respectively. The positioning ribs 18 integrally protrude in the lengthwise direction of the support tubes 11, respectively. The positioning ribs 18 also extends along the front parts of each of the support tubes 11. The positioning ribs 18 engage with the engagement clips 13c such that the positioning ribs 18 prevent the engagement clips 13c from sliding along the support tubes, respectively. The engagement clips 13c engaged with the lower faces 11a of the support tubes 11 are sandwiched between the positioning ribs 18 and the retaining members 12. Thus, the engagement clips 13c do not slide forward or backward along the lower faces 11a of the support tubes 11.

Figure 4:
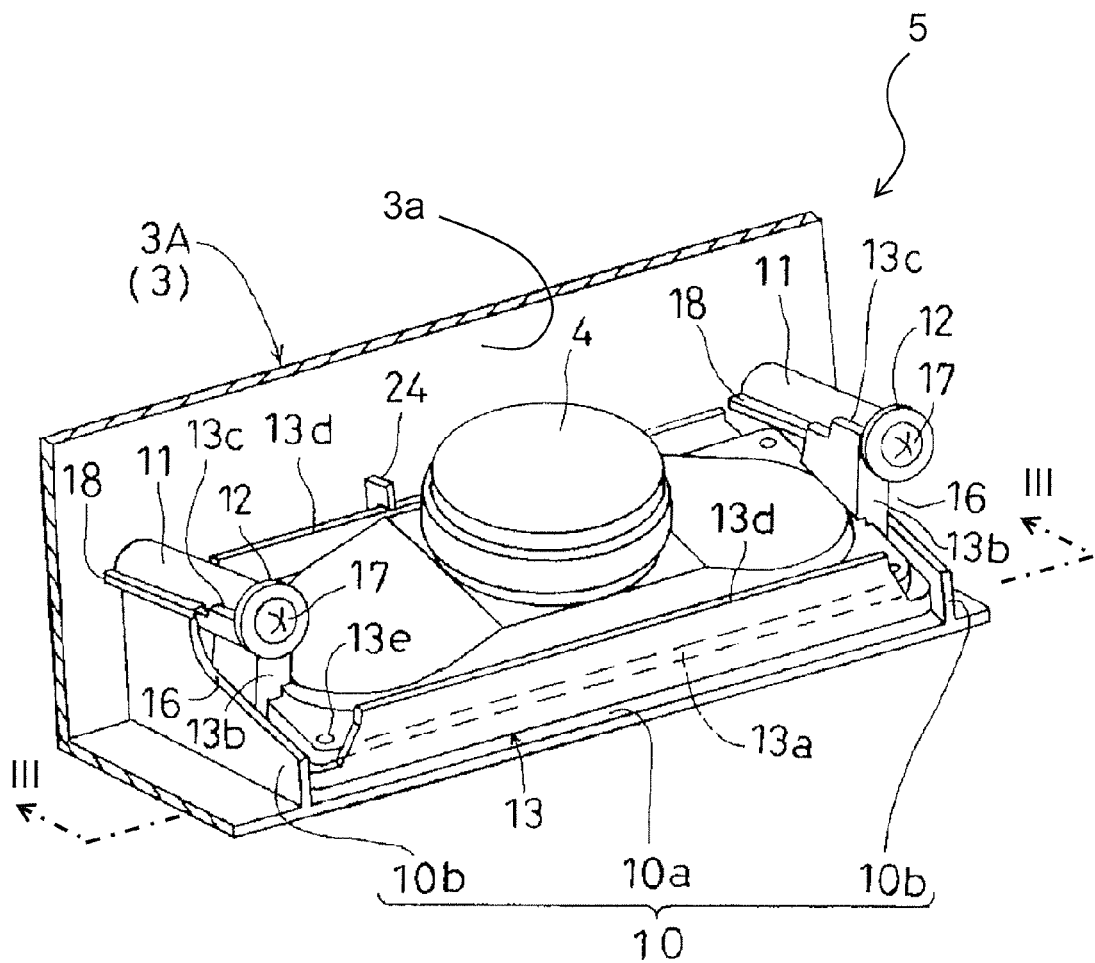
FIG. 4 is a partial perspective view of a speaker attachment structure of the flat panel display device illustrated in FIG. 1.

As shown in FIGS. 4 and 5, the stoppers 24 are formed at spaced apart locations on the rear face 3b of the front cabinet 3A. The stoppers 24 are provided a specific distance apart from each other. The stoppers 24 integrally protrude rearward relative to the rear face 3b from the rear face 3b of the front cabinet 3A above the speaker mount 10. The stoppers 24 contact with or are in the vicinity of the outer peripheral edge 4a of the speaker 4 when the speaker 4 is mounted on the speaker mount 10 via the annular main body 13a of the holder 13. More specifically, the stoppers 24 engage with one of the edge plates (e.g., front side edge plate) 3d of the holder 13.

The procedure for attaching the speaker 4 will now be described. The edge plates 13d of the holder 13 are pushed apart to bring the outer peripheral edge 4a of the speaker 4 into contact with the annular main body 13a of the holder 13. The positioning protrusions 13e are fitted into the positioning holes 21 of the speaker 4, thereby attaching the holder 13 to the outer peripheral edge 4a of the speaker 4. After this, as shown in FIG. 4, the speaker 4 and the attached holder 13 are placed on the speaker mount 10. The arms 13b are elastically displaced to engage the engagement clips 13c with the lower faces 11a of the support tubes 11, respectively. The outer peripheral edge 4a of the speaker 4 is brought into contact with or into the vicinity of lower edges of the stoppers 24.

With the speaker attachment structure 5 of the flat panel display device, the speaker 4 can be attached quickly and easily to the proper location at the lower part inside the cabinet 3 merely by mounting the speaker 4 on the speaker mount 10 via the annular main body 13a of the holder 13, and engaging the engagement clips 13c of the holder 13 with the lower faces 11a of the support tubes 11. Thus, assembly efficiency can be increased.

Even if the cabinet 3 should be subjected to an impact, such as in a drop test, and this impact force attempts to cause the speaker 4 to fall out of the speaker mount 10, since the engagement clips 13c are engaged with the support tubes 11, and the engagement clips 13c are prevented by the retaining members 12 from coming loose from the support tubes 11, the speaker 4 will resist this impact force and be held securely in place on the speaker mount 10.

Because the vibrations of the speaker 4 are absorbed by the holder 13, which is made of an elastic material, vibrations from the speaker 4 are not transmitted to the front cabinet 3A and do not cause buzzing. Thus, a pleasant acoustic environment can be provided to the user. In particular, the speaker 4 is secured to the front cabinet 3A without being directly fastened to the front cabinet 3A with screws. Thus, vibrations from the speaker 4 are not transmitted to the front cabinet 3A even if the speaker 4 are supported via a relatively large contact surface between the speaker 4 and the annular main body 13a.

The holder 13 supports the speaker 4 and absorbs vibrations from the speaker 4. Thus, there is no need for vibration deadening nonwoven cloth or the like. As a result, the structure is simple, and the cost can be kept low.

Since the gap between the speaker mount 10 and the outer peripheral edge 4a of the speaker 4 is blocked off by the annular main body 13a of the holder 13, sound does not leak laterally and become trapped inside the cabinet 3. Thus, the speaker 4 of higher acoustic quality can be provided.

The edge plates 13d contact with the outer peripheral edge 4a of the speaker 4. This allows the holder 13 to be attached securely to the speaker 4 so that it will not accidentally come off, and allows sound leakage to be further prevented.

Also, even if the cabinet 3 should be subjected to an impact, such as in a drop test, and this impact force attempts to cause the speaker 4 to fall out of the speaker mount 10, this is prevented by the stoppers 24 that are provided integrally protruding from the rear face 3b of the front cabinet 3A. Thus, the speaker 4 can be held even more securely on the speaker mount 10.

In the embodiment given above, a liquid crystal television set is given as an example, but the speaker attachment structure 5 is not limited to or by this, and can also be applied to various other kinds of flat panel display device, such as a liquid crystal monitor.

GENERAL INTERPRETATION OF TERMS

In understanding the scope of the present invention, the term "comprising" and its derivatives, as used herein, are intended to be open ended terms that specify the presence of the stated features, elements, components and groups, but do not exclude the presence of other unstated features, elements, components and groups. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the present invention, the following directional terms "forward, rearward, above, downward, vertical, horizontal, below and transverse" as well as any other similar directional terms refer to those directions of a flat panel display device equipped with the present invention. Accordingly, these terms, as utilized to describe the present invention should be interpreted relative to a flat panel display device equipped with the present invention as used in the normal operating position.

While only a preferred embodiment has been chosen to illustrate the present invention, it will be apparent to those skilled in the art from these disclosures that various changes and modifications can be made herein without departing from the scope of the invention as defined in the appended claims. The functions of one element can be performed by two, and vice versa. Every feature which is unique from the prior art, alone or in combination with other features, also should be considered a separate description of further inventions by the applicant, including the structural and/or functional concepts embodied by such feature. Furthermore, the foregoing descriptions of the preferred embodiment according to the present invention are provided for illustration only, and not for the purpose of limiting the invention as defined by the appended claims and their equivalents.

What is claimed is:

1. A flat panel display device comprising:
    a cabinet with front and rear cabinet parts, the front cabinet part including
        a speaker mount that is disposed at a lower portion of the front cabinet part, and
        a pair of support tubes that extends rearward relative to a rear face of the front cabinet part from the rear face of the front cabinet part above the speaker mount;
    a flat panel display component disposed within the cabinet;
    a holder made of an elastic material, the holder including
        an annular main body that is disposed on the speaker mount of the cabinet,
        a pair of arms that extends upward relative to the annular main body from both short side portions of the annular main body, respectively, and
        a pair of engagement portions that is disposed at distal end portions of the arms, respectively, the engagement portions engaging with lower faces of the support tubes, respectively;
    a speaker disposed on the annular main body of the holder within the cabinet; and
    a pair of retaining members disposed at distal end portions of the support tubes, respectively, the retaining members having a diameter that is larger than that of support tubes such that the retaining members prevent the engagement portions of the holder from sliding along the support tubes, respectively.

2. The flat panel display device according to claim 1, wherein
    the holder further includes a pair of edge plates that extends along both long side portions of the annular main body, the edge plates contacting with an outer peripheral portion of the speaker.

3. The flat panel display device according to claim 2, wherein
    the front cabinet part further includes a stopper that extends rearward relative to the rear face of the front cabinet part from the rear face of the front cabinet part above the speaker mount, the stopper engaging with one of the edge plates of the holder.

4. The flat panel display device according to claim 1, wherein
    the front cabinet part of the cabinet is integrally formed as a one-piece, unitary member from a synthetic resin.

5. The flat panel display device according to claim 4, wherein
    the holder is integrally formed as a one-piece, unitary member.

6. The flat panel display device according to claim 5, wherein the annular main body is disposed on an upper face of the speaker mount of the cabinet, the upper face of the speaker mount slanting downward relative to the rear face of the front cabinet part as approaching rearward relative to the rear face of the front cabinet part.

7. The flat panel display device according to claim 6, wherein the support tubes extend perpendicular to the rear face of the front cabinet part.

8. The flat panel display device according to claim 7, wherein the support tubes include engagement ribs that extend along front portions of the support tubes, respectively, the engagement ribs engaging with the engagement portions of the holder such that the engagement ribs prevent the engagement portions of the holder from sliding along the support tubes, respectively.

9. The flat panel display device according to claim 8, wherein the annular main body of the holder includes a plurality of positioning protrusions at corner portions of the annular main body, and an outer peripheral portion of the speaker includes a plurality of positioning holes that mates with the positioning protrusions of the annular main body, respectively.

10. The flat panel display device according to claim 9, wherein the arms of the holder include latching portions, respectively, the latching portions engaging with the outer peripheral portion of the speaker in a direction perpendicular to the upper face of the speaker mount.

* * * * *